United States Patent [19]

Nelle

[11] Patent Number: 5,485,680
[45] Date of Patent: Jan. 23, 1996

[54] ENCAPSULATED MEASURING APPARATUS

[75] Inventor: Günther Nelle, Bergen, Germany

[73] Assignee: Dr. Johannes Heidenhain GmbH, Traunreut, Germany

[21] Appl. No.: 259,925

[22] Filed: Jun. 15, 1994

[30] Foreign Application Priority Data

Jul. 15, 1993 [DE] Germany .......................... 43 23 635.9

[51] Int. Cl.⁶ ................................................ G01B 11/02
[52] U.S. Cl. ............................................... 33/705; 33/706
[58] Field of Search ............................. 33/703, 705, 706, 33/707

[56] References Cited

U.S. PATENT DOCUMENTS

| | | |
|---|---|---|
| 3,579,836 | 5/1969 | Kraus et al. . |
| 4,477,726 | 10/1984 | Reichl .................... 33/706 X |
| 4,492,033 | 4/1984 | Ichikawa . |
| 4,580,346 | 4/1986 | Reichl ........................ 33/705 |
| 4,982,508 | 1/1991 | Nelle et al. ............. 33/707 X |

FOREIGN PATENT DOCUMENTS

| | | | |
|---|---|---|---|
| 2846768 | 2/1979 | Germany . | |
| 3415164 | 10/1985 | Germany | ................................. 33/705 |
| 3412879 | 11/1985 | Germany | ................................. 33/706 |
| 3824751 | 2/1990 | Germany . | |
| 3480791 | 2/1990 | Germany | ................................. 33/705 |
| 0091511 | 5/1986 | Japan | ...................................... 33/703 |

*Primary Examiner*—Alvin Wirthlin
*Attorney, Agent, or Firm*—Anderson Kill Olick & Oshinsky

[57] ABSTRACT

An encapsulated measuring apparatus for determining the relative position of two objects is disclosed which comprises a measurement embodiment, a probing means, a hollow member, a seal, an entrainment member, an installation pedestal and at least one additional seal, wherein the measurement embodiment, together with the probing component probing same, is placed into the hollow member, which is closed by means of the seal through which passes the entrainment member which connects the probing component with an object to be measured. The entrainment member is connected, with the installation pedestal. A space between the hollow member and the installation pedestal is shielded against harmful effects from the surroundings by the at least one additional seal. The at least one additional seal is effective outside of a region where the entrainment member passes through its corresponding seal.

8 Claims, 2 Drawing Sheets

5,485,680

ENCAPSULATED MEASURING APPARATUS

FIELD OF THE INVENTION

The present invention pertains to an encapsulated measuring apparatus and, in particular, to a length or angle-measurement apparatus.

BACKGROUND OF THE INVENTION

In encapsulated measuring arrangements, it is necessary to provide a slot in the housing through which an entrainment member can protrude into the housing, in order to connect the structural unit, which is located there with the installation pedestal which is disposed externally of the housing in order to probe a measuring embodiment or scale. In case of relative motion of, for instance, the bed or base and the trolley of a machine, the movement of the machine transferred to the measurement graduation of the measuring embodiment or the structural unit to be probed, wherein the entrainment member is relatively moved in the direction of the motion inside the slot and the movement is measured.

The slot in the housing must be sealed as tightly as possible for protecting the highly sensitive scale, and a possibility for passing the entrainment member inside the housing, must solely exist in the region of the entrainment member.

Such a measurement arrangement is shown in DE-PS 28 46 768, wherein a scale and a probing unit are placed inside a housing, which comprises a slot which is continuous in measuring direction, which is closed by means of sealing elements which are disposed in a roof-shaped manner in the form of plastics or rubber lips, and through which an entrainment member passes in order to connect the probing unit with the object which is to be measured.

SUMMARY OF THE INVENTION

The present invention is based upon the task of creating a measuring apparatus, wherein the sealing of the housing slot is to be further improved by simple means, wherein, in particular, the region of the entrainment member passage is to be protected in an improved manner.

The present invention is directed to an encapsulated measuring apparatus for the determination of the relative position of two objects. The scale, together with the probing component probing same, is placed into a housing which is closed by means of a seal, through which passes an entrainment member which connects the probing component with the object which is to be measured. The entrainment member is connected, on its part, with the installation pedestal. The space between the housing and the installation pedestal is shielded against harmful effects from the surroundings by least one additional seal, wherein the additional seal is effective outside of the region where the entrainment member passes through its seal.

The advantages of the measuring apparatus of the present invention are seen in that a labyrinth-like additional sealing of the space between the housing and the installation pedestal achieves an especially sound protection against action of media which are utilized in a squirted or sprayed manner. Due to the adapted shaping of the additional sealing elements, this effect is also maintained in the local passage of the entrainment means through the roof-shaped sealing elements.

Other objects and advantages of the present invention will be made evident to those skilled in the art upon a review of the Description of the Preferred Embodiment taken in conjunction with the Drawings which follow.

DESCRIPTION OF THE PREFERRED EMBODIMENT

Figure 1:
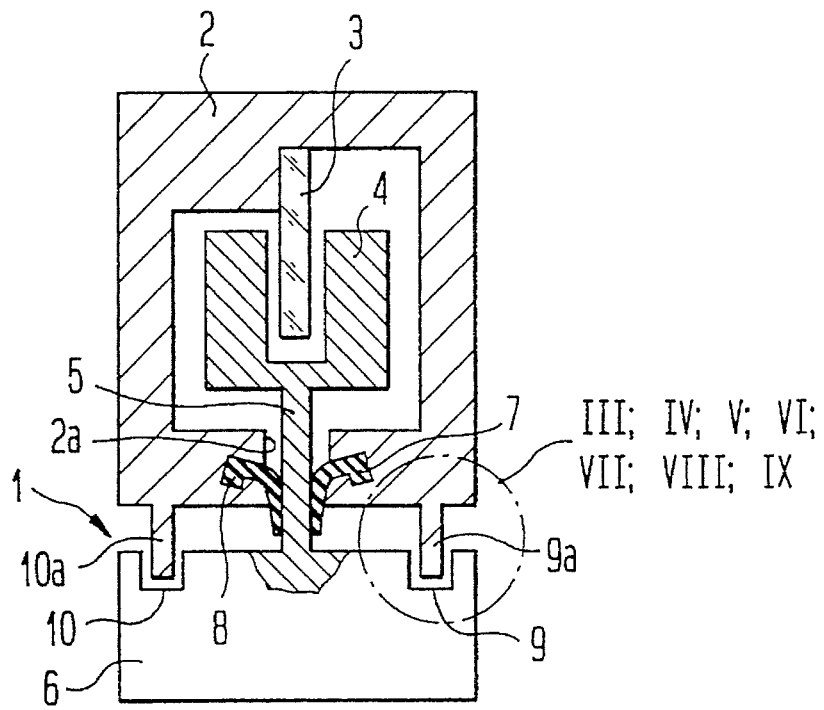
FIG. 1 illustrates a diagrammatic cross-section through a length measuring apparatus, which is the subject of the present invention.

The length measurement apparatus 1, which is shown diagrammatically in FIG. 1, consists of a housing 2, where a scale carrier member 3 is fastened in a known manner. The housing is shown in section so that a probing arrangement 4 is visible. The probing arrangement 4 probes, in a known manner, a scale (not shown) photoelectrically, which scale is placed upon a scale carrier member 3. An entrainment member 5, which has a cross-section of a twin-edged sword, connects the probing device 4 with an installation pedestal 6. The entrainment member 5 protrudes through a longitudinal slot 2a, in the housing 2, which slot is sealed by sealing lips 7 and 8 which are disposed in a V-shaped manner.

Frequently, the disposition of the sealing lips 7, 8 is described to be roof-shaped. This designation, manner and way of viewing is dependent upon the attachment position of the positional measuring apparatus 1.

Additional seals 9 and 10 are provided at the installation pedestal 6, in the region of the entrainment member 5, which, together with corresponding recessed shapes 9a, 10a at the housing 2, form a sort of labyrinth, so that additional squirt protection exists in the area of the installation pedestal 6.

Figure 2:
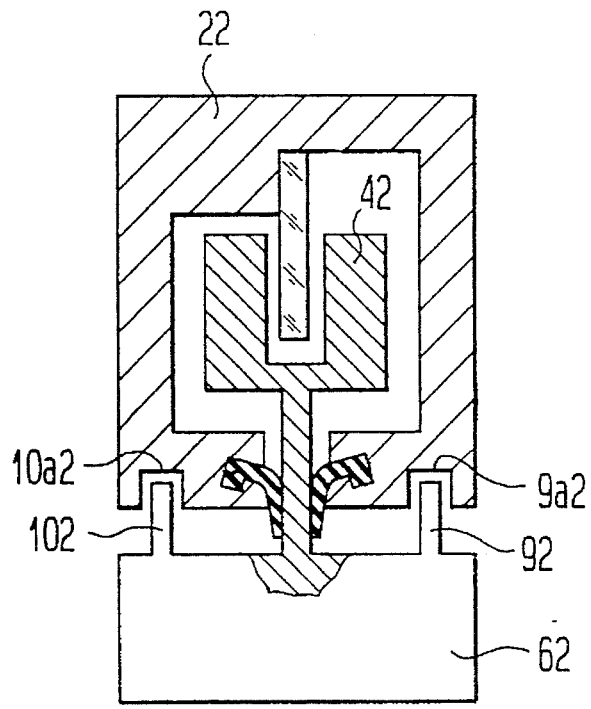
FIG. 2 illustrates a diagrammatic cross-section through a slightly varied length measurement apparatus of FIG. 1 together with an entrainment member.

FIG. 2 illustrates the geometric reverse wherein the recessed shapings 9a2, 10a2 are configured, in a negative manner, in the housing 22, into which sealing webs 92, 102 which are disposed on the installation pedestal 62 engage. The labyrinth-like sealing effect is equivalent to that illustrated in FIG. 1.

Other alternate embodiment examples are illustrated in FIGS. 3 to 9, which are shown as individually extracted details III; IV: V: VI; VII; VIII; IX and wherein the repetitive details in FIGS. 1 and 2 have been omitted. While the Figures illustrate the numerous possibilities and variations of the additional seals, it is important to note that the present invention is not limited to the illustrated alternate embodiments.

Figure 3:
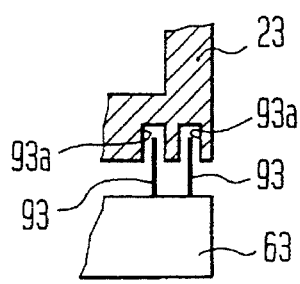
FIGS. 3 to 9 illustrate various alternate embodiments of the apparatus of the present invention.

FIG. 3 illustrates projections 93 at the installation pedestal 63, which, in multiple arrangement, engage into multiple, slot-like recesses 93a in the housing 23. These projections 93 can be disposed as separately installed components in the form of webs within the installation pedestal 63 or in the hollow member (not shown). In each case, the corresponding recessed shapes are appropriately provided in their respectively other component.

Figure 4:
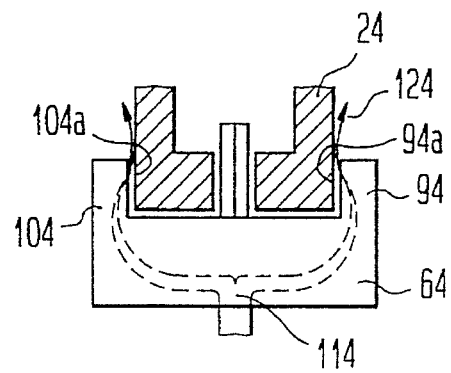
Figure 7:
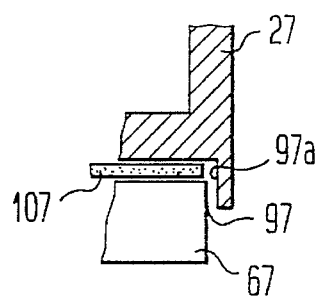

One of the simplest constructional forms of an additional seal 94, 94a; 104, 104a is illustrated in FIG. 4, which are provided between the installation pedestal 64 and the housing 24. In a similar manner, the seal 97, 97a is provided between the pedestal 67 and the housing 27, as shown in FIG. 7. The sealing effect can be improved if a flowing medium 124, such as air or nitrogen, is blown through channels 114 into the external regions of the installation pedestal 64. An a frame-shaped elastic filler, 107 only a portion of which is shown in FIG. 7, from a foam material, in the external region of the installation pedestal 67, is also feasible.

Figure 5:
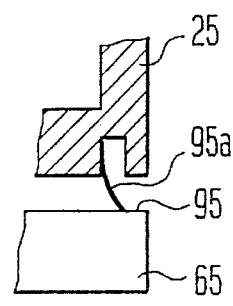

FIG. 5 illustrates an alternate embodiment wherein the elastic sealing strips 95a are attached along the housing 25 which slide upon the surfaces 95 of the installation pedestal 65 and provide a seal in this manner. In this case, the elastic sealing strips can be disposed on the installation pedestal thus sliding on the housing.

Figure 6:
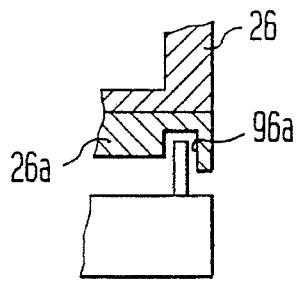

Another alternate embodiment is illustrated in FIG. 6 wherein a separate component 26a is set upon the standard housing 26, with the sealing slot 96a extending in the separate component.

Figure 8:
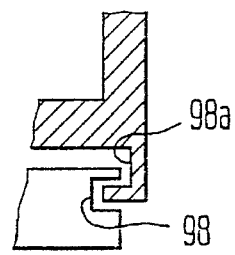
Figure 9:
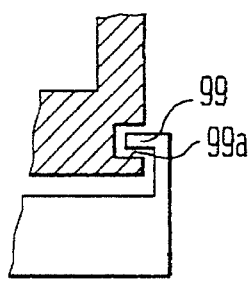

FIGS. 8 and 9 illustrate labyrinth seals 98, 98a and 99, 99a which function in an identical manner, and which labyrinths can be multiplied.

The number of the illustrated alternate embodiments serves to clarify that it is not the specific constructional shape which constitutes the present invention, but rather, it is the feature that, apart from the seal 7, 8 contacting and embracing the entrainment member 5, an additional seal is provided in the space between the housing 2 and the installation base 6, which seals the sealing area where the entrainment member 5 passes through the roof-shaped sealing lips 7 and 8.

Figure 10:
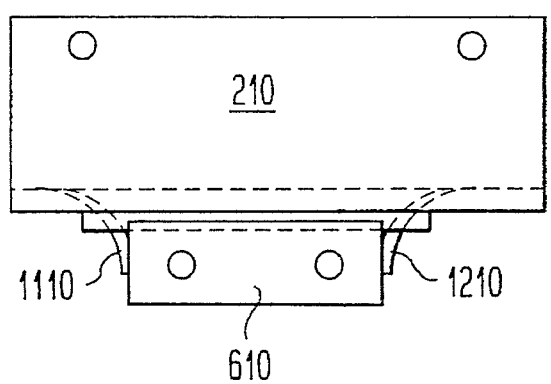
FIG. 10 illustrates a longitudinal view of a length measurement apparatus.

Further, as is evident from FIG. 10, additional seals 1110, 1210 are provided in the front region of the installation pedestal 610. The seals 1110 and 1210 engage the adjacent surface of the housing 210 in the end face region of the installation pedestal in a wiper-like manner, as shown in FIG. 10, improving sealing characteristics of the entire sealing arrangement in a manner similar to wipers which are adapted to the cross-sectional shape of the housing 210.

While the present invention has been described and illustrated in various preferred embodiments, such are merely illustrative of the present invention and are not to be construed as limitations thereof. Accordingly, the present invention includes all modifications, variations and/or alternate embodiments with the scope of the present invention limited only by the claims which follow.

What is claimed is:

1. An encapsulated measuring apparatus for determining a relative position of two objects, comprising:

a housing;

an installation pedestal for supporting said housing;

scale means located in said housing;

means located in said housing for probing said scale;

first seal means for sealing said housing;

an entrainment member extending through said first seal means for connecting said probing means with an object to be measured, said entrainment member being connected with said installation pedestal; and at least one additional seal means provided between said installation pedestal and said housing for additionally sealing said housing from harmful effects, said at least one additional seal means being provided in a region remote from a location in which said entrainment member extends between said housing and said installation pedestal.

2. The encapsulated measuring apparatus of claim 1, wherein said at least one additional seal means comprises a slot-like recess, formed in one of said housing and said installation pedestal, and web attached to another one of said housing and said installation pedestal and engaging in said slot-like recess, whereby a labyrinth-like seal means is formed.

3. The encapsulated measuring apparatus as set forth in claim 1, wherein said additional seal means is provided in an end face region of said installation pedestal adjacent to said housing.

4. The encapsulated measuring apparatus of claim 1, wherein said at least one additional seal means comprises sealing strips sliding on surfaces of said installation pedestal.

5. The encapsulated measuring apparatus of claim 1, wherein said at least one additional seal means comprises an elastic member.

6. The encapsulated measuring apparatus of claim 5, wherein said elastic member is formed as a frame made of a foamed material.

7. The encapsulated measuring apparatus of claim 1, wherein said at least one additional seal means comprises a channel formed between said housing and said installation pedestal in said remote region, and a medium which flows through said channel.

8. The encapsulated apparatus of claim 7, wherein said medium is one of air and dry nitrogen.

* * * * *